US005422783A

United States Patent [19]
Darbee

[11] Patent Number: 5,422,783
[45] Date of Patent: Jun. 6, 1995

[54] MODULAR CASING FOR A REMOTE CONTROL HAVING UPPER HOUSING MEMBER SLIDINGLY RECEIVED IN A PANEL SECTION

[75] Inventor: Paul V. Darbee, Santa, Calif.

[73] Assignee: Universal Electronics Inc., Twinsburg, Ohio

[21] Appl. No.: 11,200

[22] Filed: Jan. 29, 1993

Related U.S. Application Data

[63] Continuation-in-part of Ser. No. 908,252, Jul. 2, 1992.

[51] Int. Cl.6 .......................... H05K 5/02; H04Q 1/02
[52] U.S. Cl. .................................. 361/680; 235/1 D; 235/145 R
[58] Field of Search .................. 455/347–349, 455/352, 90; 340/825.56, 825.69, 825.72; 364/708.1; 359/142, 146, 148; 235/472, 1 D, 145 R, 146; 361/680; 200/5 A; 341/176

[56] References Cited

U.S. PATENT DOCUMENTS

| | | | |
|---|---|---|---|
| 4,712,105 | 12/1987 | Köhler | 340/825.69 |
| 4,890,832 | 1/1990 | Komaki | 235/146 X |
| 4,959,810 | 9/1990 | Darbee et al. | 455/352 X |
| 5,023,936 | 6/1991 | Szczutkowski et al. | 455/347 X |
| 5,202,817 | 4/1993 | Koenck et al. | 361/680 |
| 5,235,328 | 8/1993 | Kurita | 359/146 X |

FOREIGN PATENT DOCUMENTS 2389938  1/1979  France ...................... 235/1 D Primary Examiner—Michael W. Phillips
Attorney, Agent, or Firm—James P. Hanrath; Thomas R. Vigil

[57] ABSTRACT

A modular casing for a remote control comprises a keyboard having keys thereon for selecting a predetermined function or channel selected from a group of keyboards having different layouts or shapes of keys and adapted to mate with a circuit board having switches thereon corresponding to the keys; an upper housing member having ports for receiving corresponding keys of the keyboard which extend outwardly at least partially through the ports when coupled thereto which is selected from a group of upper housing members having different layouts of ports for different layouts or shapes of keys and with or without an overlay panel; a panel section with grooves; and a lower housing member. The upper member is slidingly received in the grooves of the panel section to form a unitary cover which is secured to the lower housing member by screws or snap-fit interaction.

4 Claims, 14 Drawing Sheets

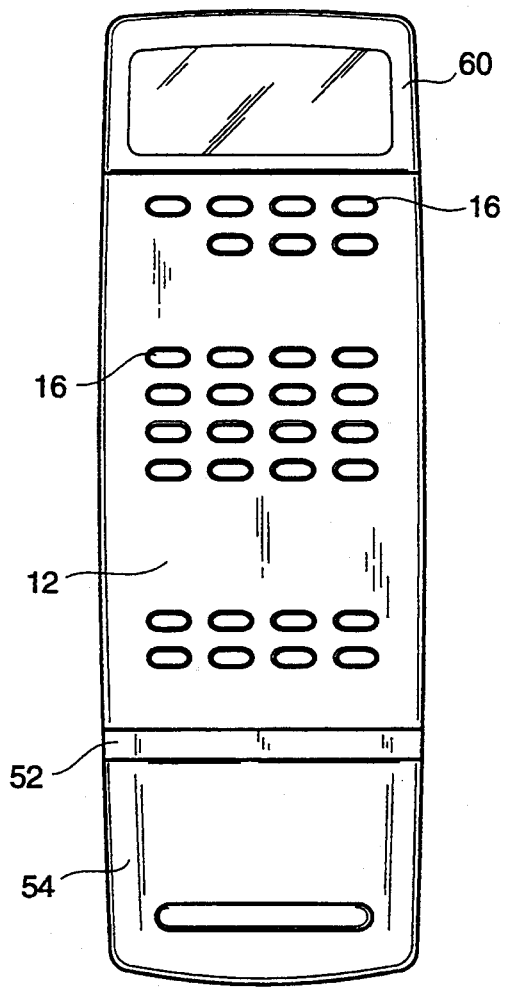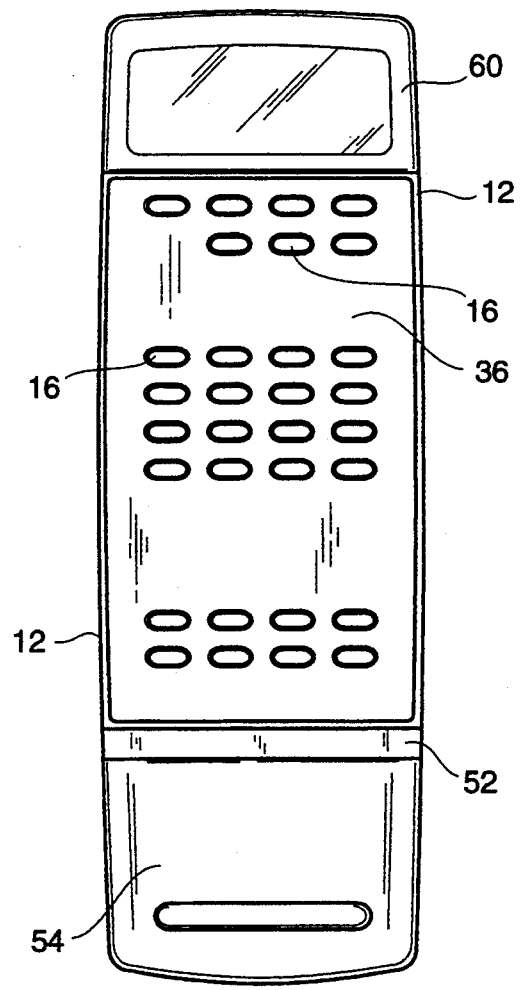

FIG. 4A  FIG. 4B
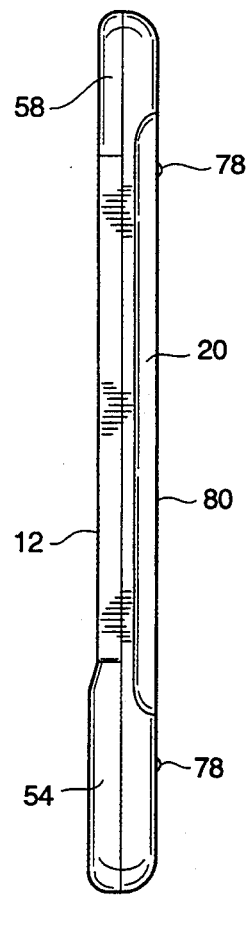
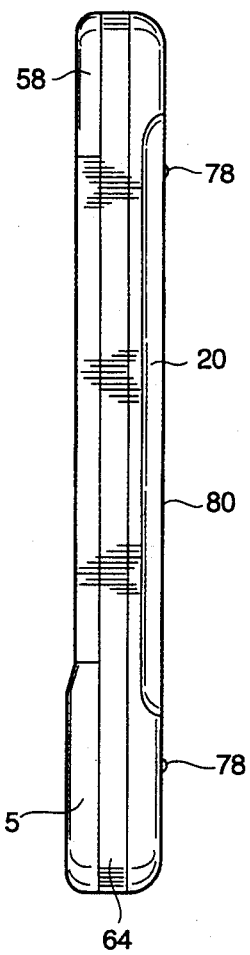
FIG. 5A  FIG. 5B
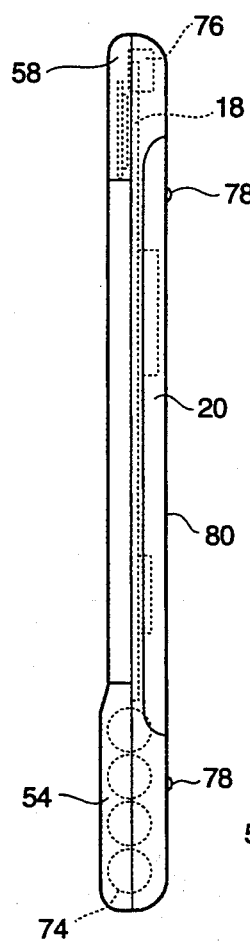
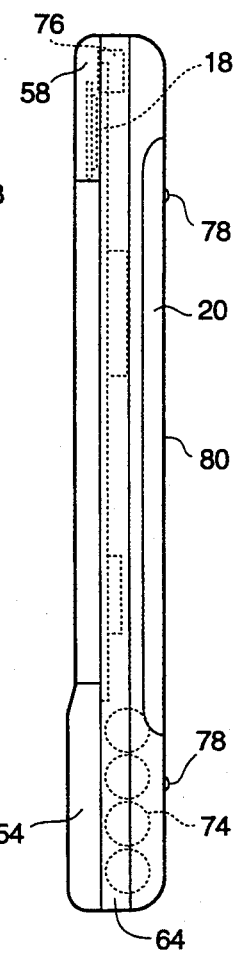

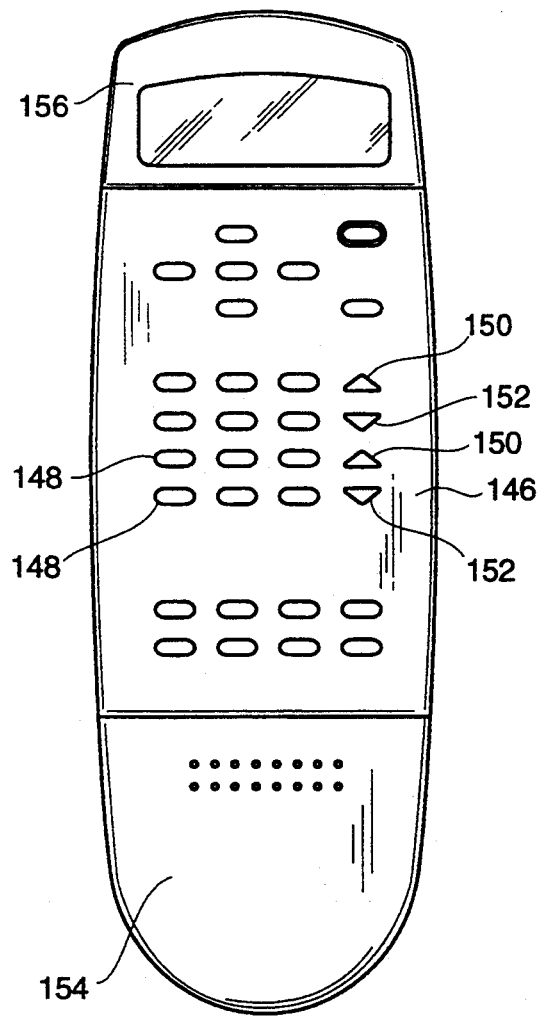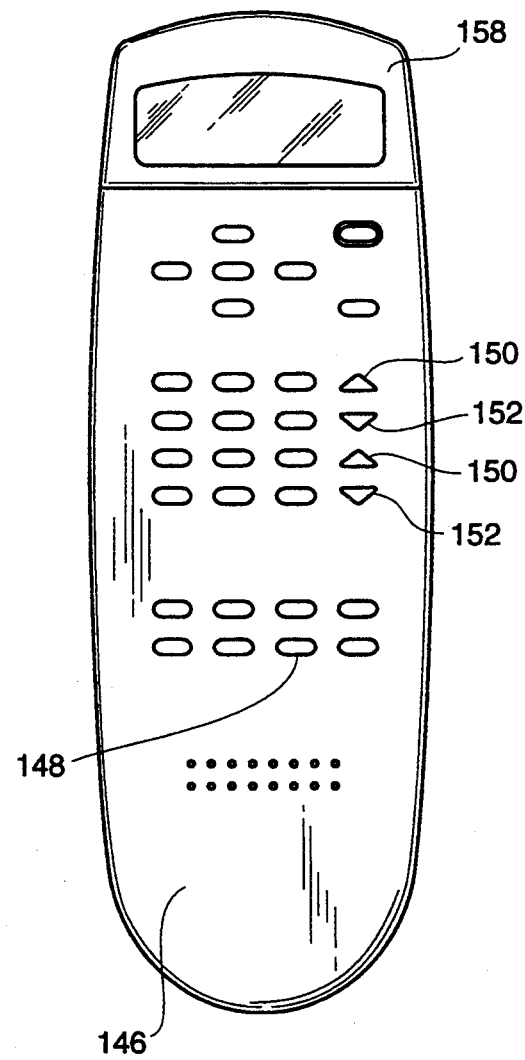

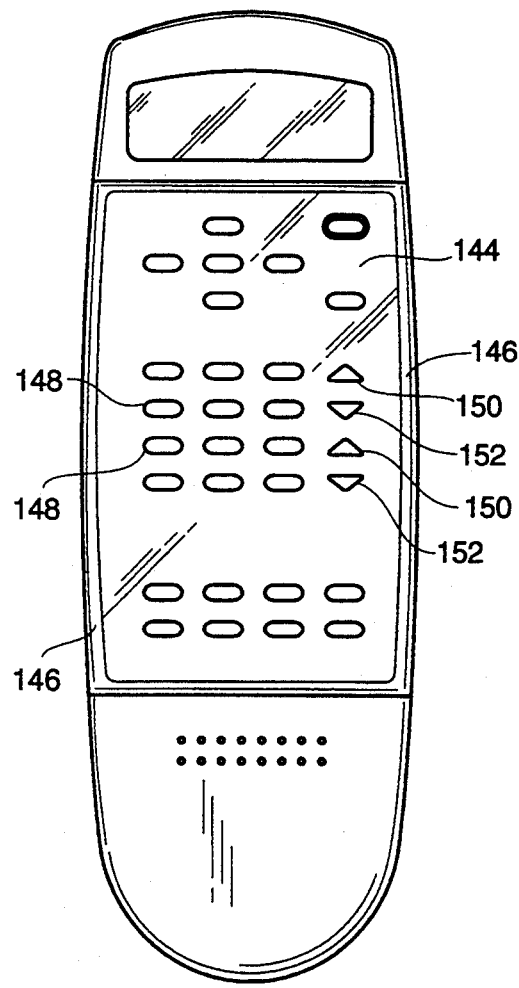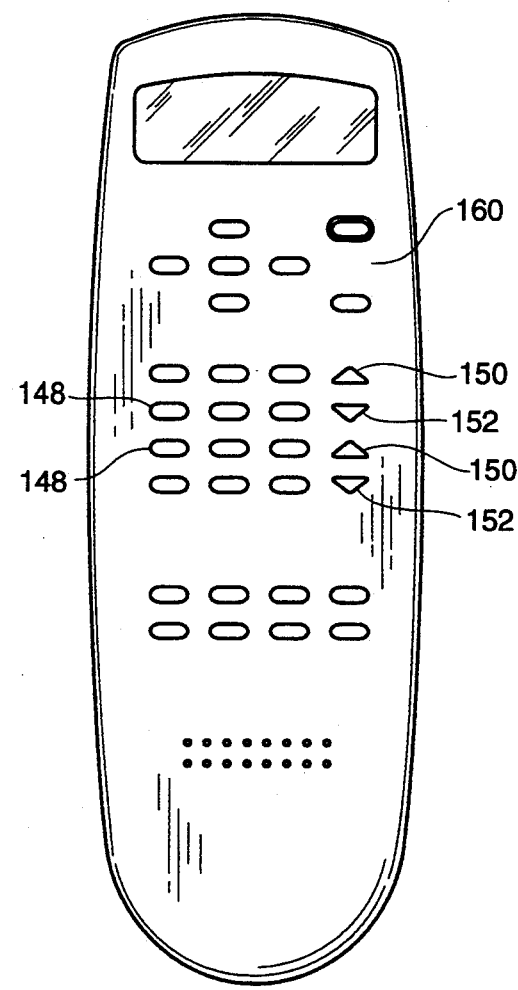

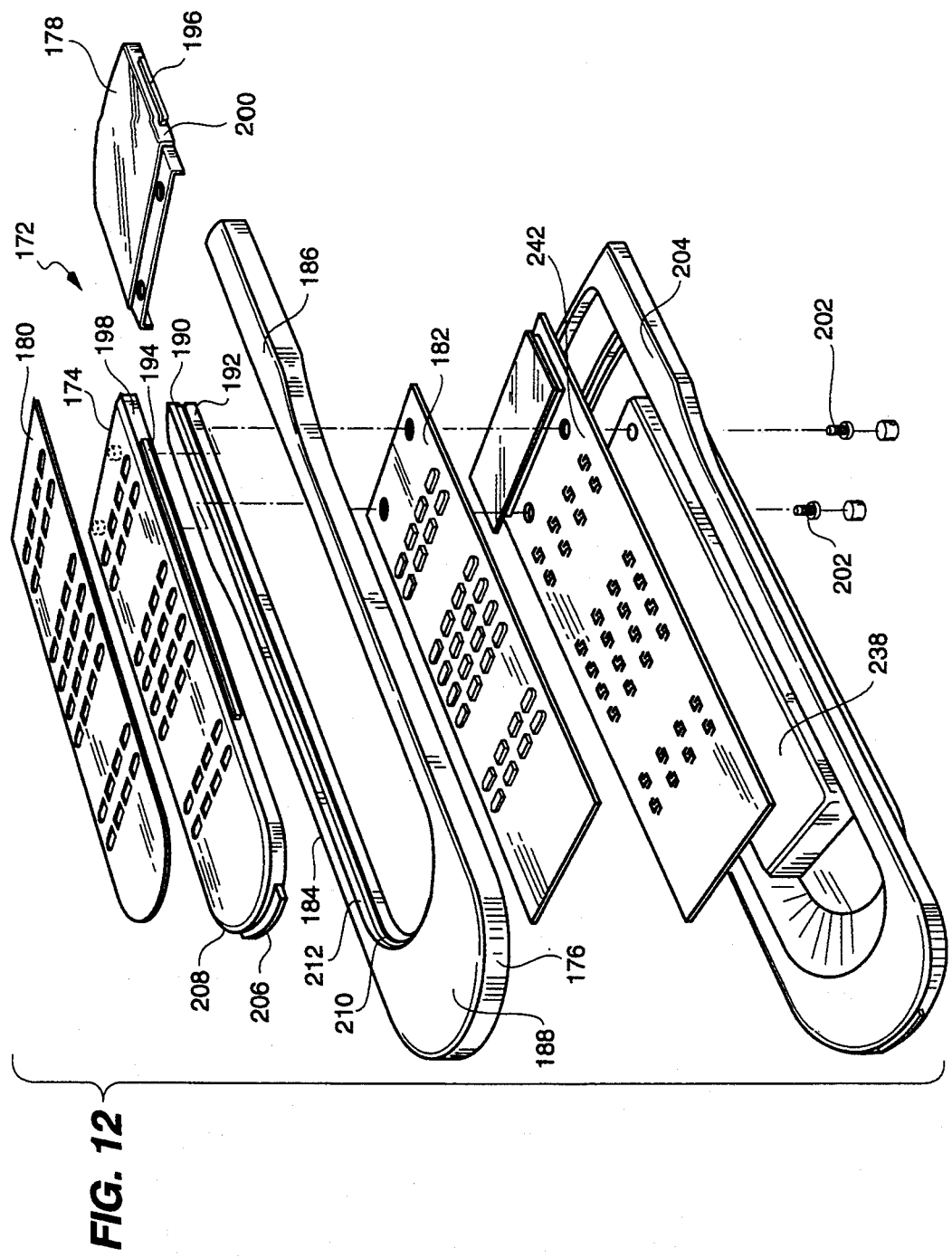

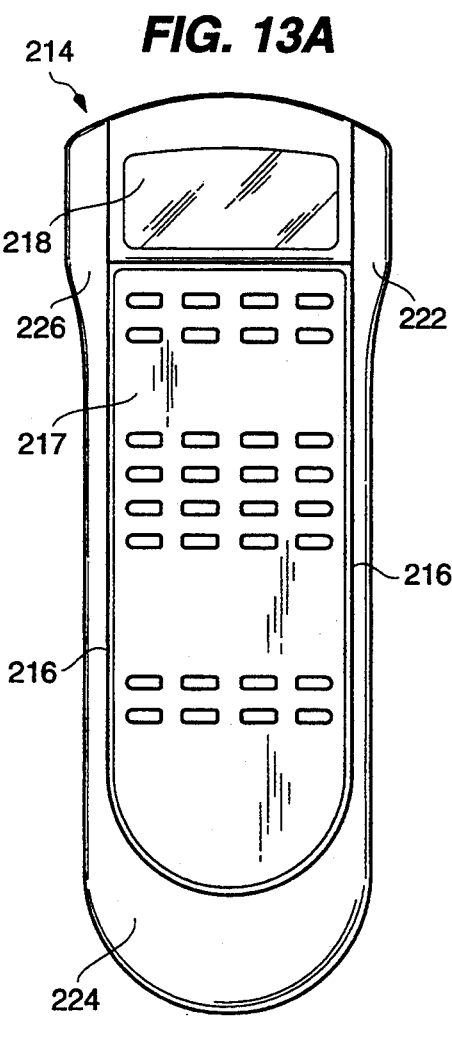
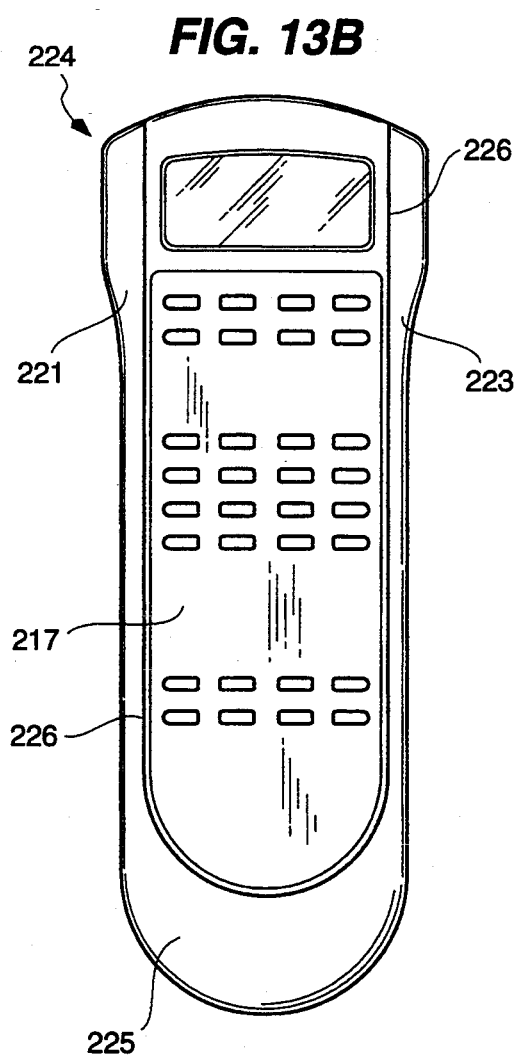

MODULAR CASING FOR A REMOTE CONTROL HAVING UPPER HOUSING MEMBER SLIDINGLY RECEIVED IN A PANEL SECTION

CROSS REFERENCE TO RELATED APPLICATIONS

This application is a Continuation-in-Part of U.S. patent application Ser. No. 07/908,252, filed Jul. 2, 1992.

BACKGROUND OF THE INVENTION

1. Field of the Invention

The present invention relates to a modular remote control casing, and more particularly, to a modular remote control casing including a lower housing member and an interchangeable upper housing member cooperative with an interchangeable keyboard and the lower housing member for use in a remote control casing having otherwise standardized component casing parts.

2. Description of the Related Art Including Information Disclosed Under 37 CFR §1.97-1.99

Universal remote controls are typically hand held devices capable of emitting infrared light modulated with information, which when received by equipment capable of processing such information, can control various functions of the equipment. A remote control is commonly called universal if it can send IR signals modulated by the codes pertaining to a wide variety of equipment, usually manufactured by different companies.

A remote control may have various design, pattern, shapes, and numbers of keyboard keys operative with electric circuitry to emit infrared light modulated with information to control functions of equipment. The present invention advantageously provides a remote control casing having an interchangeable upper housing member selected from a group of upper housing members having different layouts of ports cooperative with an interchangeable keyboard selected from a group of keyboards having different layouts of keys for use with other standardized component parts of the casing.

Heretofore, modular construction of programmable controllers have been proposed. Such controls however provide modular components to a controller structurally connected to the equipment it is operating.

In U.S. Pat. No. 5,094,123 to Latham there is disclosed a push-pull cable control actuator assembly arranged for use with different numbers of cables using different numbers of cables, using different numbers of the same modular components. A housing includes two stationary side members with one or more modular intermediate assemblies supported between the side members. One side member and each intermediate assembly includes a support element with connections for one or two control cable sheaths and a control disc rotatably supported on the support element. The control disc is provided with connections for one or two control cable cores and a handle with knob for manually rotating the disc to thereby push or pull the core relative to the stationary sheath. Sheath connections on the support element and core connections on the control disc are connectable at a variety of positions to accommodate cables entering at a variety of angles to the control box, and for both pushing and pulling simultaneously for use as a relay station. Such actuators serve for remote control. The control actuator controls elements such as transmissions and throttles on palpation devices.

In U.S. Pat. No. 3,942,077 to Powers there is disclosed a modular panel construction for a programmable controller and frame therefor which comprises an input/output panel housing which is readily connectable to adjacent housing and cooperates with up to four removable input/output modules. The input/output housing comprises a supporting frame structure, a removable panel board secured to the frame, and terminal strips for interconnection between the input/output modules and the user's equipment, and equipment wiring housing. The wiring from the equipment being controlled is connected directly to the fixed terminals and need not be removed when the input/output modules are removed or replaced.

In U.S. Pat. No. 3,701,101 to Heiz et al. there is disclosed a modular remote control and supervisory system switch gear comprising a plurality of switching units including command devices, switching devices, and signaling devices which are combined according to given switching functions, each of the command devices and switching devices comprising transmitters for delivering command signals and each of the switching devices and signaling devices comprising receivers for receiving the command signals. The command, switching and signaling devices are contained in slide-in units inserted into shells of a switch box. Each switch-in unit comprises the transmitters and receivers for the devices contained in the respective switch-in unit, and the transmitters and receivers of all slide-in units are connected to a control cable interconnecting the slide-in units. The control cable is connected to a central unit producing address signals in cyclic sequence and comprises a signal generator for producing readout signals of a time period which is shorter than that of the address signals. Thus, no wiring plans are required for the switch gear for making the control connections and the switch gear may be assembled from prefabricated parts and combined with slide-in units which may be rearranged and exchanged without requiring complicated changes in the control wiring. It is only necessary to fix the number and type of the required command devices, switching devices and signaling devices and to establish an "address plan" according to which the desired switching units are assembled from the different devices, the address units of the devices being sent to the addresses as indicated in the address plan.

A modular construction for a remote control operable when structurally separated from the equipment it is operating is disclosed in U.S. Pat. No. 4,143,417 to Wald et al. This device is a portable data-gathering apparatus formed by modular components having operate-standby modes. The data-gathering unit is hand-held and formed by removably connected control and power modules. The control module contains a keyboard, a display device, a data input probe, and a micro processor. The power module contains a rechargeable battery with a converter and associated power logic, and a memory system with associated memory control logic. During the operation mode, input data enters the control module and is forwarded to the memory in the power module. As data is gathered during portable operation, the memory may reach capacity or the battery voltage may drop, or both. The power module may be removed from the control module and replaced by a fresh power module with a fully charged battery and an empty memory. The expired power module is inserted into a service module for charging the battery or transmitting the data to a remote terminal, or both. The control module may also be inserted into the service module where it is activated by a stationary power supply and interfaced with the memory in the power module for stationary operation. Thus, the hand-held data-gathering unit is formed of modular components which interface independently with a stationary component.

The present invention provides a modular casing for a remote control structurally separated from the equipment it is operating wherein the casing has an interchangeable upper housing member chosen from a group of upper housing members having different layouts of ports cooperative with an interchangeable keyboard chosen from a group of keyboards having different layouts of keys for use in a casing having other standardized component parts. Therefore, only the interchangeable upper housing member and interchangeable keyboard need be designed with a corresponding number, design or pattern, and shape of upper housing member ports servicing keyboard keys as befits the function and purpose of the desired remote control as modular components cooperative with other standardized component parts of the casing for a remote control.

SUMMARY OF THE INVENTION

According to the present invention there is provided a modular casing for a remote control comprising a keyboard, having keys thereon for selecting a predetermined function or channel, selected from a group of keyboards having different layouts and/or shapes of keys and adapted to mate with a circuit board having switches thereon corresponding to the keys; an upper housing member having ports for receiving corresponding keys of the keyboard which extend at least partially through the ports when said keyboard is positioned adjacent said upper housing member, the upper housing member being selected from a group of upper housing members having different layouts of ports for different layouts and/or shapes of keys and with or without an overlay panel; a lower housing member; and means for securing the upper housing member upon said keyboard and to the lower housing.

BRIEF DESCRIPTION OF THE DRAWINGS

FIGS. 2A, 2B, and 2C of the drawings are top views of three variations of a modular casing for remote control similar to FIG. 1 and shows at FIG. 2A the upper housing member joined with first and second panel sections, at FIG. 2B the modular casing for remote control of FIG. 2A further including an optional keypad overlay overlaying the upper housing member, and at FIG. 2C a upper housing member cooperative with only one panel section.

FIGS. 4A and 4B of the drawings are side perspective views of two embodiments of an assembled modular casing remote control of FIG. 1 and shows at FIG. 4A the casing without a spacer body and at FIG. 4B the casing with a spacer body.

FIGS. 5A and 5B of the drawings are side elevational views of the modular casings for remote control of FIGS. 4A and 4B respectively illustrating internal component parts in phantom and shows at FIG. 5A the casing without a spacer and at FIG. 5B the casing with a spacer body.

FIGS. 8A, 8B, 8C, and 8D of the drawings are top views of four variations of an assembled modular casing for remote control similar to FIG. 7 but illustrates the upper housing member having a different layout of ports for a different design and shape of keyboard keys and shows at FIG. 8A the upper housing member joined with first and second panel sections, at FIG. 8B a upper housing member cooperative with only one panel section, at FIG. 8C the modular remote control casing of FIG. 8A further including an optional keypad overlay overlaying the upper housing member, and at FIG. 8D an upper housing member comprising a unitary cover.

FIG. 12 of the drawings is an exploded view of yet another alternative embodiment of the modular remote control casing of the present invention including an optional keypad overlay, an upper housing member cooperative with a first U-shaped panel section and a second panel section, a keyboard, a liquid crystal display circuit board, and a lower housing which includes a battery compartment.

FIGS. 13A, 13B, 13C, and 13D of the drawings are top views of four variations of an assembled modular casing for remote control similar to FIG. 12 and shows at FIG. 13A a three-piece unitary cover comprising an upper housing member having a keyboard overlay and a cooperative second panel section both slideably received within a U-shaped first panel section, at FIG. 13B a two-piece unitary cover comprising an upper housing member having a keyboard overlay slideably received within a U-shaped first panel section, at FIG. 13C an upper housing member without a keyboard overlay slideably received within a spacer body interconnected with the U-shaped first panel section, and at FIG. 13D an upper housing member without a keyboard overlay and a cooperative second panel section both slideably received within a spacer body interconnected with the U-shaped first panel section.

DESCRIPTION OF THE PREFERRED EMBODIMENTS

Figure 16:
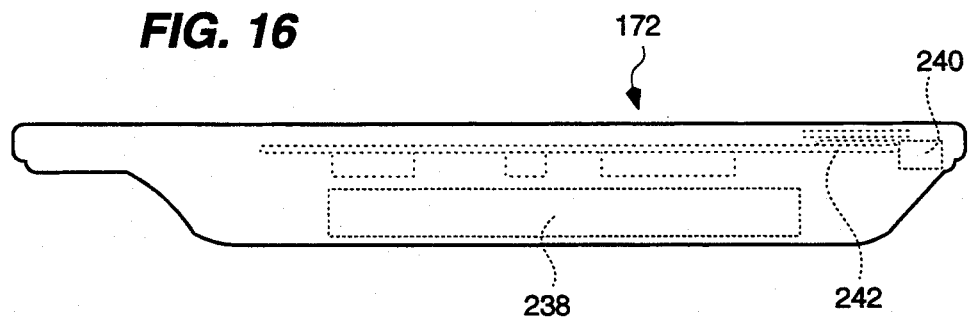
FIG. 16 of the drawings is a side elevational view of the modular casing for remote control of FIG. 14 illustrating internal component parts in phantom.
Figure 17:
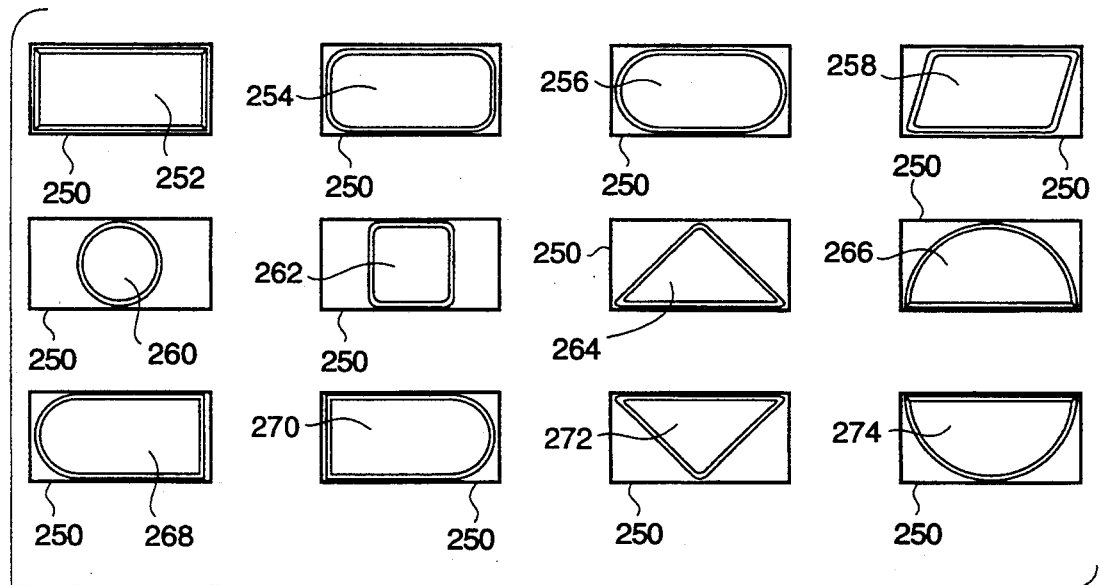
FIG. 17 of the drawings is a top plan view of rectangular shaped ports for the keyboard overlays and upper housing members of the previous embodiments of the modular casing for remote control and shows various shaped keys received in the rectangular shaped ports.
Figure 18:
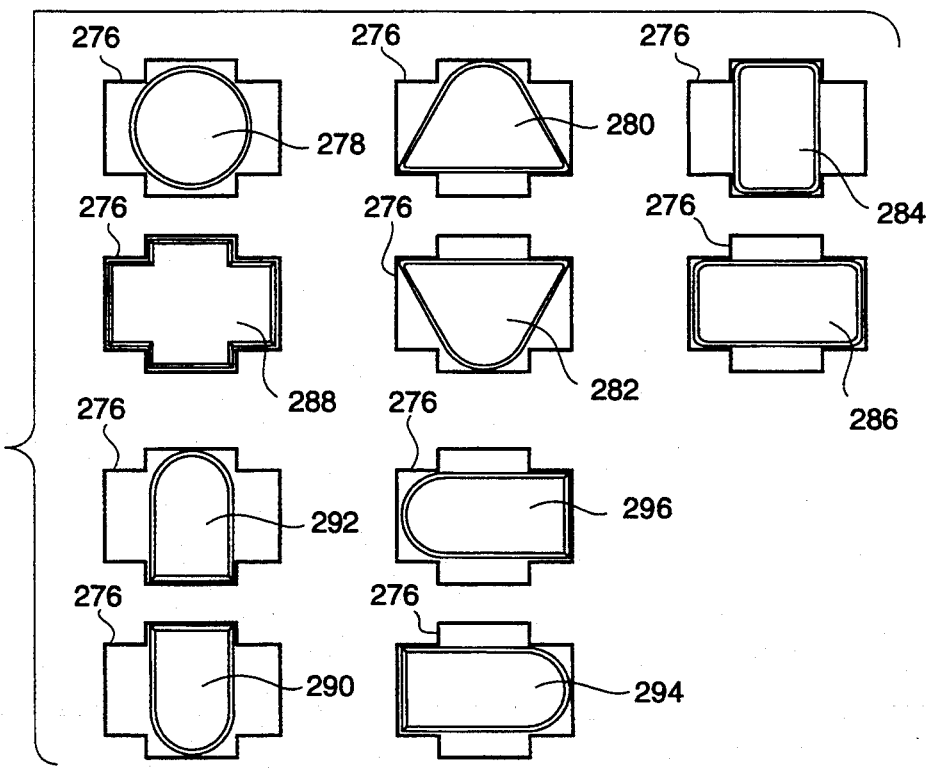
FIG. 18 of the drawings is a top plan view of cross-shaped ports for the keyboard overlays and upper housing members of the previous embodiments of the modular casing for remote control and shows various shaped keys received in the cross-shaped ports.

Referring now to the drawings in greater detail, there is illustrated in FIGS. 1 through 16 multiple embodiments of the modular casing for remote control of the present invention using various shaped ports and keys illustrated in FIGS. 17 and 18 for operating a controlled device.

Figure 1:
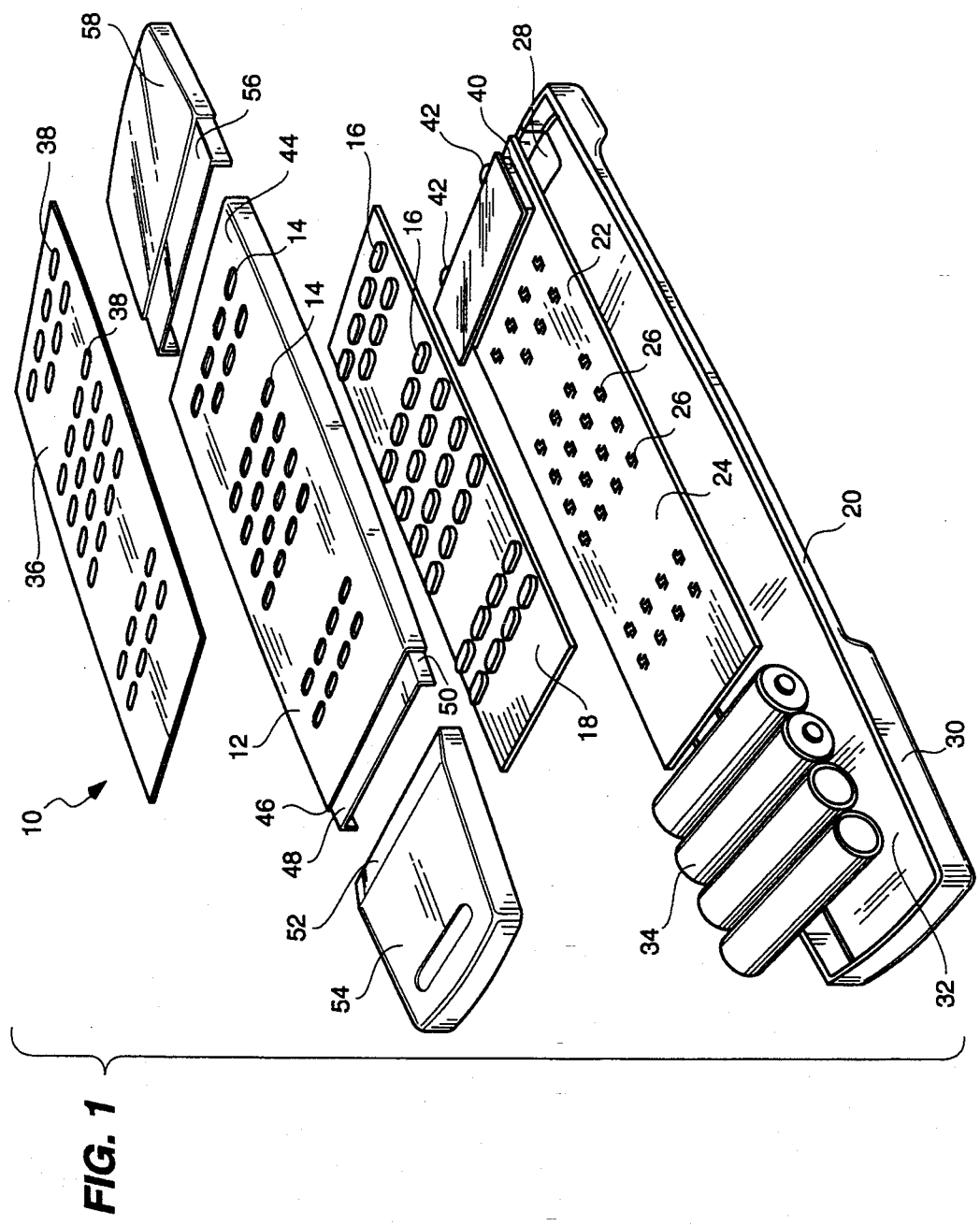
FIG. 1 of the drawings is a exploded view of the components of the modular casing for remote control of the present invention and shows an optional keypad overlay, an upper housing member cooperative with a first panel section and a second panel section, a keyboard, a liquid crystal display circuit board, and a lower housing which includes a battery compartment.

In FIG. 1 is shown a modular casing for a remote control 10 which includes an upper housing member 12 having a plurality of ports 14 for receiving a plurality of corresponding keys 16 of a keyboard 18. The number, pattern or design, and shapes of the ports 14 of upper housing member 12 and the number, pattern or design, and shapes of corresponding keys 16 of keyboard 18 are arbitrary and may vary depending upon the function or purpose and design of remote control 10. Thus, upper housing member 12 is an interchangeable modular component part selected from a group of upper housing members having different layouts of ports for use with corresponding different layouts or shapes of keys for a keyboard. Likewise, the keyboard 18 is a interchangeable modular component part selected from a group of keyboards having different layouts or shapes of keys and adapted to mate with a circuit board having switches thereon corresponding to the keys.

The upper housing member 12 and the lower housing 20 are designed to hold therebetween the keyboard 18 that includes keys 16 for selecting a predetermined function or channel of the controlled device. The keys 16 extend outwardly at least partially through the ports 14 of upper housing member 12 when keyboard 18 is mounted adjacent to upper housing member 12. Electrical circuitry sandwiched between lower housing 20 and keyboard 18 includes a circuit board 22 having a keyboard facing side 24 having a plurality of switch pad receiving cross-points 26 and a liquid crystal display unit (LCD) 28 for remotely controlling a controlled device. A rearward end 30 of lower housing 20 comprises a battery storage compartment 32 for operative batteries such as four AAA alkaline batteries 34. An optional keypad overlay 36 having overlay ports 38 corresponding to upper housing ports 14 and keypad keys 16 may be adhesively affixed over upper housing member 12. The optional keypad overlay 36 is usually of plastic construction The circuit board 22 includes a plurality of cross-points 26 which are in vertical alignment with a corresponding plurality of keys 16. When a key is depressed, a corresponding switch pad shorts or closes cross-points 26, which allow signals to pass to the LCD inputs, to determine which keys were pressed, and to execute a certain function associated with such pressed key. Although not shown in FIG. 1, it is understood that each cross-point is coupled to the LCD by a conductive trace. An upper portion 40 of circuit board 22 further includes a light-emitting device 42 for indicating when a keypad is pressed on the remote control 10.

In FIG. 1, upper housing member 12 has exploded therefrom a front end portion 44 and a rear end portion 46. Upper housing member 12 is fixed in orientation over keyboard 18 when a recessed upper surface 48 and a recessed side surface 50 of rear end portion 46 is connected within an embracing lid end 52 of a first panel section 54 and the front end portion 44 is fitted over a recessed receiving end 56 of a second panel section 58. When fitted together, first panel section 54, upper housing member 12, and second panel section 58 are dimensioned to snap-fit with respect to each other to thereby form a unitary cover that snap-fits onto the lower housing 20 directly, or interconnectably by means of a spacer body, to capture therebetween keyboard 18, the electrical circuitry of circuit board 18 and batteries 34. The snap-fit relationship of these parts form means for securing the upper housing member 12 upon keyboard 16 and to lower housing 20. As an alternative to the three-piece construction of the upper housing member 12, first panel section 54 and second panel section 58 to form a unitary cover, the upper housing member may itself comprise a one-piece unitary cover (e.g., see FIG. 8d) which snap-fittingly interconnects with the lower housing member or the upper housing member may have an end thereof snap-fittingly connectable to a panel section to thereby form a unitary cover of two-piece construction which snap-fittingly interconnects with the lower housing member (e.g., see FIG. 2c).

Figure 2C:
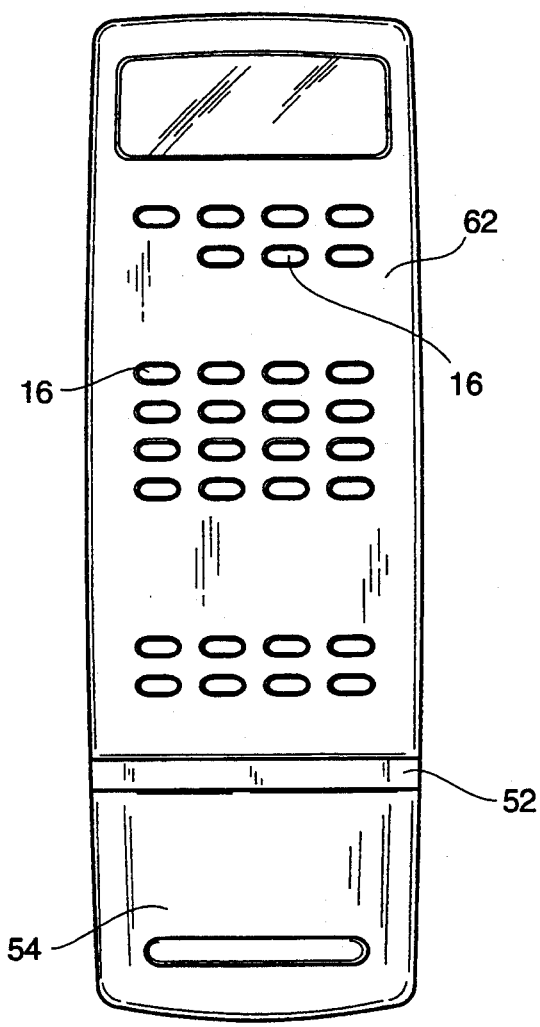

FIGS. 2A, 2B, and 2C illustrates varying designs of a modular casing for remote control similar to FIG. 1. In FIG. 2A, upper housing member 12 is joined to first panel section 54 and a different second panel section 60. FIG. 2B is the same as FIG. 2A with the exception that keyboard overlay 36 is adhesively placed over upper housing member 12. FIG. 2C shows an alternative upper housing member 62 cooperative only with a panel section 54 to, when assembled, form a unitary cover of two-piece construction.

FIGS. 3, 4A, 4B, 5A, and 5B illustrate that a spacer body 64 may be positioned between an upper housing member and any associated panels and a lower housing member. In the exploded view of FIG. 3, upper housing member 12 joined with first panel section 54 and second panel section 58 all have a downwardly facing recessed lip 66 dimension to snap-fittingly engage upper surface 68 of spacer body 64 while lower housing 20 has an upwardly facing recessed lip 70 designed to snap-fittingly engage lower surface 72 of spacer body 64. FIGS. 4A and 4B present the casing in side assembled view and shows at FIG. 4A upper housing member 12 joined with first panel section 54 and second panel section 58 in snap-fitted connection with the lower housing 20. However, in FIG. 4B, the assembled upper housing member, and first and second panel sections thereto are snap fitted to the upper surface of spacer body 64 while spacer body 64 at its lower surface is snap fitted upon the lower housing 20. Use of a spacer body provides additional internal spacing for the modular casing for remote control of the present invention. In this regard, FIGS. 5A and 5B are side elevational views of FIGS. 4A and 4B respectively showing the internal component parts in phantom and illustrating the additional internal spacing gained in a remote control when spacer body 64 is used. FIG. 5A further illustrates that a panel section such as first panel section 54 may function as an access cover to a battery storage area 74. Further, light emitting diode 76 is shown operatively connected to the electric circuitry of circuit board 18.

Figure 3:
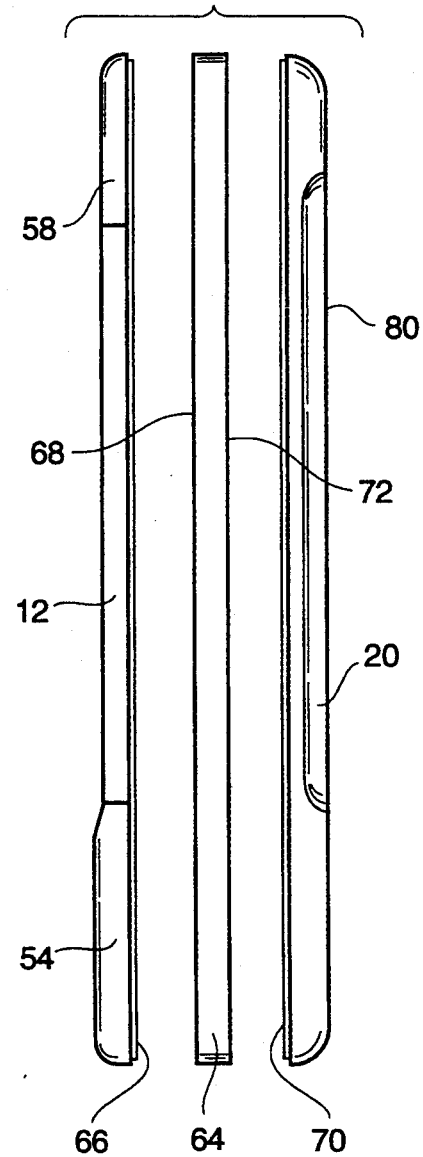
FIG. 3 of the drawings is a exploded side plan view of the modular casing for remote control of FIG. 1 and shows use of a spacer body between the upper housing member and associated front and rear panels and the lower housing member.
Figure 6:
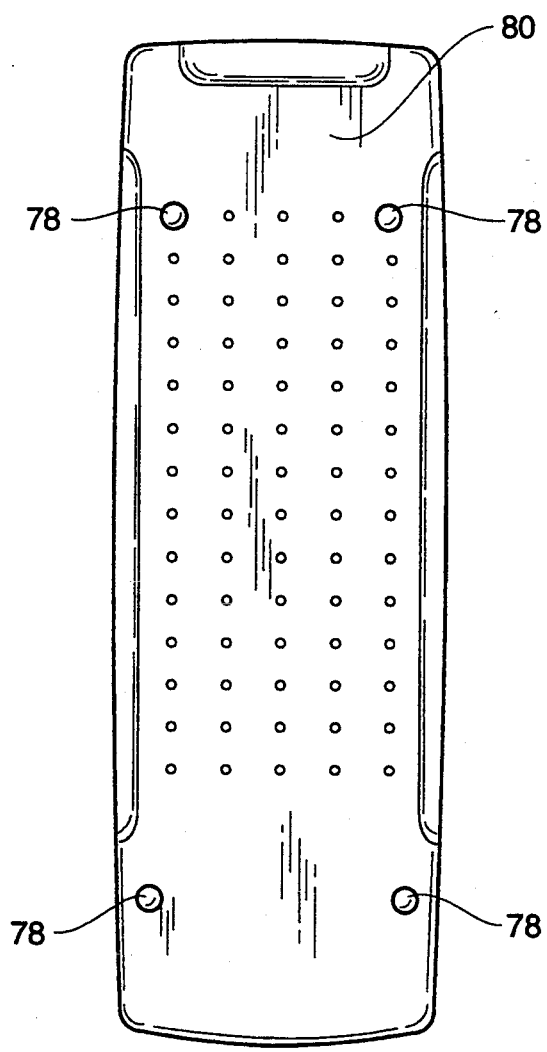
FIG. 6 of the drawings is a bottom plan view of an assembled modular casing for remote control of FIG. 1.

Lower housing 20 may have seating pads 78 adhesively or otherwise fixed to bottom surface 80 of lower housing 20 as illustrated in FIGS. 4A, 4B, 5A, 5B, and 6. Alternatively, as illustrated in FIG. 3, seating pads may be omitted from the bottom surface 80 of lower housing 20.

The modular casing for remote control of the present invention in its multiple embodiments may thus consist of standardized parts such as lower housing and even a single panel section or first and second panel sections cooperative with the upper housing member while modifications to the casing due to remote control design and function capability may be undertaken only with respect to interchangeable pieces comprising the upper housing member and keyboard.

Figure 7:
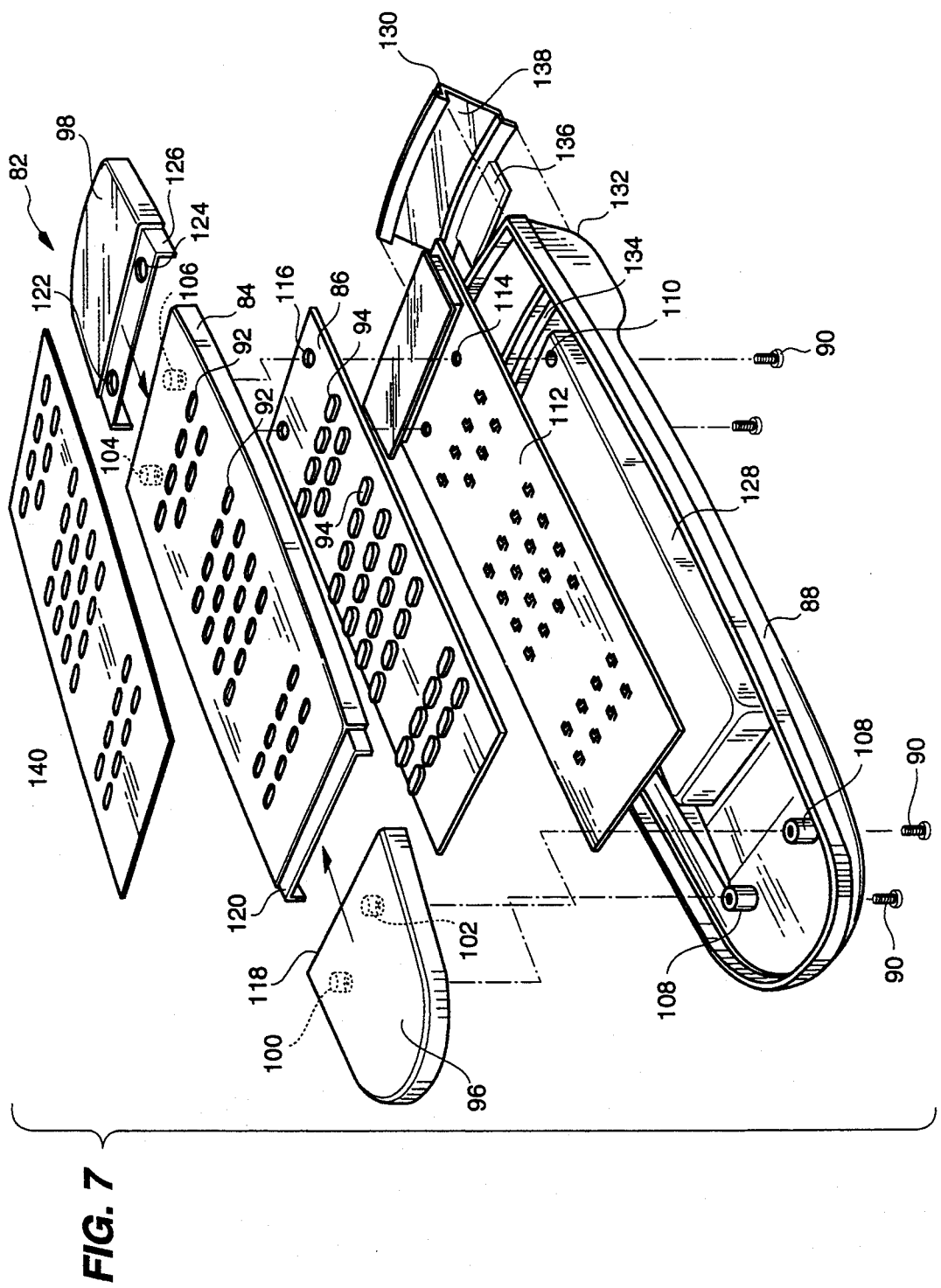
FIG. 7 of the drawings is an exploded view of the components of an alternative embodiment of the modular casing for remote control of the present invention and shows an optional keypad overlay, an upper housing member cooperative with a first panel section and a second panel section, a keyboard, a liquid crystal display circuit board, a lower housing which includes a battery compartment, a lens cap cooperate with the lower body, and a plurality of screws for securing the upper housing member upon the keyboard and to the lower housing member.

FIG. 7 is an exploded component illustration of an alternative modular casing for remote control 82 wherein the means for securing upper housing member 84 upon keyboard 86 and to lower housing 80 comprise a plurality of screws 90 as opposed to the snap-fit capability of modular casing 10 of FIG. 1. Similar to the casing of FIG. 1, interchangeable upper housing member 84 has a plurality of ports 92 for receiving a corresponding plurality of keys 94 of interchangeable keyboard 86 and further cooperates in snap-fitting engagement with a first panel section 96 and second panel section 98 to form a unitary cover.

However, unlike the casing of FIG. 1, the unitary cover formed by upper housing member 84 and first panel section 96 and second panel section 98 uses screw means for securing upper housing member 84 upon keyboard 86 and to lower housing 88. Screw jackets 100 and 102 of first panel section 96, and screw jackets 104 and 106 of upper housing member 84 are vertically aligned and cooperative with screw guides 108 and 110 respectively of lower housing 88 to receive a screws 90 therein, and thereby secure the assembled three piece unitary cover over keyboard 86 and to lower housing 88. Further, electrical circuit board 112 is provided with screw ports 114 vertically aligned with screw ports 116 of keyboard 86, all of the ports of the electric circuit board 112 and keyboard 86 being vertically aligned with the corresponding screw guides of the upper housing member and lower housing.

The first panel section 96 at inwardly facing end 118 is designed to encapture a recessed rear tail section 120 of upper housing member 84 prior to the tail section encountering screw jackets 100 and 102. Second panel section 98 is provided with screw ports 122 and 124 at a inwardly facing recessed tailend 126 which are orientated to be in vertical alignment with screw jackets 104 and 104 of upper housing member 84 when second panel section 96 is united with upper housing member 84. When assembled, first panel section 96, upper housing member 84, and second panel section 98 form a unitary cover cooperative with screws that hold the same over keyboard 86, the electrical circuitry of circuit board 112, and battery storage compartment 128 and affix by screws the unitary cover to lower housing 88.

Lower housing 88 may also be provided with a front lens cap 130 to amplify or clarify the light emitting signal. In this regard, FIG. 7 illustrates an outwardly facing end 132 of lower housing member 88 having an engagement slit 134 therein dimensioned to snap-fittingly receive an engagement stem 136 rearwardly extending from lens cap 130 to lower housing member 88 and align lens surface 138 horizontally from a light-emitting diode operative with electric circuitry of circuit board 112.

Differing upper housing member embodiments of an assembled modular casing for remote control similar to that illustrated at FIG. 7 are shown in FIGS. 8A, 8B, 8C, and 8D. Keyboard overlay 140 in FIG. 7 has a plurality of ports 142 in a pattern consistent with ports 92 of upper housing member 84 and the keys 94 of keyboard 86 shown in FIG. 7. In this regard, thirty-one total ports are provided in groups of seven, twelve, and eight, respectively. In FIGS. 8A, 8B, 8C, and 8D thirty-one ports are also provided to a keyboard overlay piece 144, and an upper housing member 146 to service a plurality of keys 148, 150, and 152 of a keyboard. However, as illustrated in FIGS. 8A, 8B, 8C, and 8D, the pattern and design of the ports as well the shape of certain keys thereof differ from that illustrated in FIG. 7. This demonstrates the principle that the interchangeable modular upper housing member and interchangeable modular keyboard are each selected from a group of upper housing members or keyboards having different layouts of ports or different layouts or shapes of keys respectively as befits the function, purpose and capability of various remote controls.

In FIG. 8A upper housing member 146 is combined with a first panel section 154 and a second panel section 156. FIG. 8C is identical to FIG. 8A with the exception that a keypad overlay 144 is adhesively affixed to upper housing member 146. FIG. 8B illustrates that upper housing member 146 may be cooperative in two-piece construction with a single panel section such as panel section 158. FIG. 8D illustrates a further embodiment wherein upper housing member 160 is a unitary piece.

Figure 9:
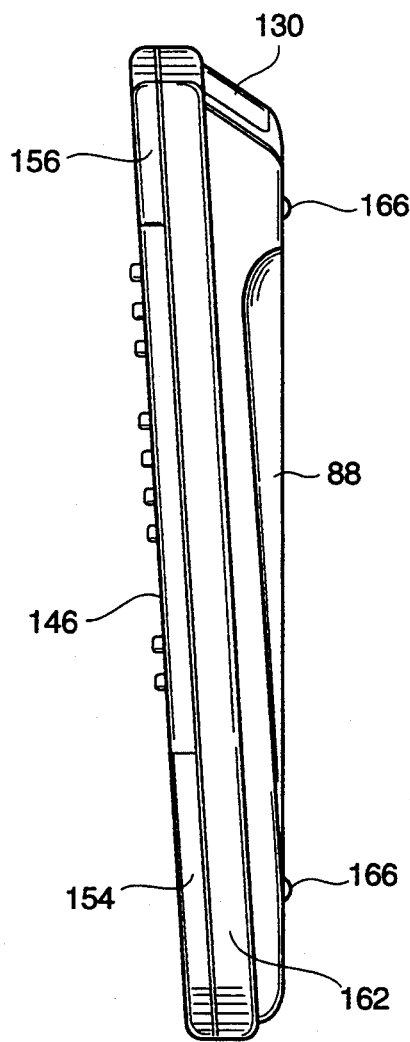
FIG. 9 of the drawings is a side perspective view of the assembled modular casing for remote control of FIG. 7.
Figure 11:
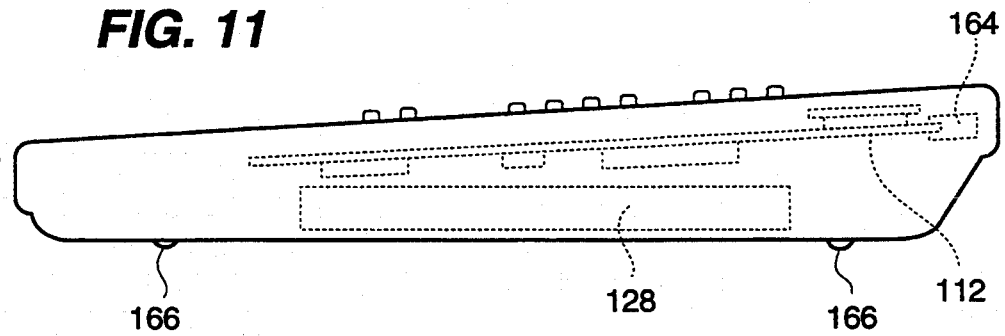
FIG. 11 of the drawings is a side elevational view of the modular casing for remote control of FIG. 7 illustrating internal component parts in phantom.

In FIG. 9 there is illustrated in side perspective the modular remote control casing of FIG. 8A further including a spacer body 162 positioned between the combined first panel section 154, upper housing member 146, second panel section 156 and lower housing member 88. FIG. 11 is a side elevational view of FIG. 9 and shows in phantom battery storage compartment 128 centrally located within lower housing member 88. FIG. 11 further shows in phantom light emitting diode 164 operatively connected to the electric circuit board 112.

Figure 10:
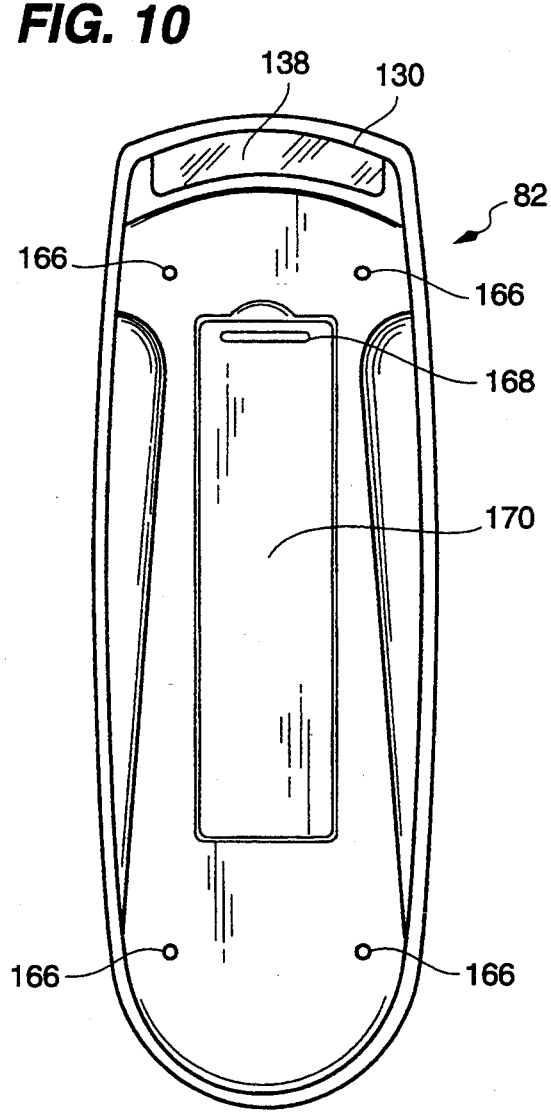
FIG. 10 of the drawings is a bottom plan view of an assembled modular casing for remote control of FIG. 7.

In FIG. 10 there is illustrated a bottom plan view of modular remote control casing 82 which shows a plurality of seating pads 166 and a latch 168 and a door casing 170 to lock the battery compartment 128 closed.

In FIG. 12 there is illustrated in exploded view of the components yet another embodiment of the modular casing for remote control of the present invention. Remote control 172 is similar to the remote control 82 of FIG. 7 in that upper housing member 174 is cooperative with a first U-shaped panel section 176 and a second panel section 178. However, upper housing member 174 as well as keyboard overlay 180 each have thirty-two ports arranged in groups of eight, sixteen, and eight to service thirty-two keys of keyboard 182 and certain keys of keyboard 182, one differently shaped than the uniform keys of FIG. 7. In FIG. 12, the first panel section has a pair of arms 184 and 186 extending from a base portion 188, the arms having a grooved track 190 at their inner side periphery 192. Upper housing member 174 and the second panel section 178 each have at least one rail 194 and 196 at their outer side periphery 198 and 200 respectively which is slideably receivable into track 190 of arms 184 and 186 of first panel section 176 to thereby form a unitary cover which snap-fittingly or by screws, such as screws 202 in FIG. 12, interconnects with lower housing member 204. Upper housing member 174 includes seating tip 206 at its bullet shaped end 208 which is designed to be received into correspondingly shaped receiving slot 210 at the inward facing outer periphery 212 of first panel section 176.

Figure 13C:
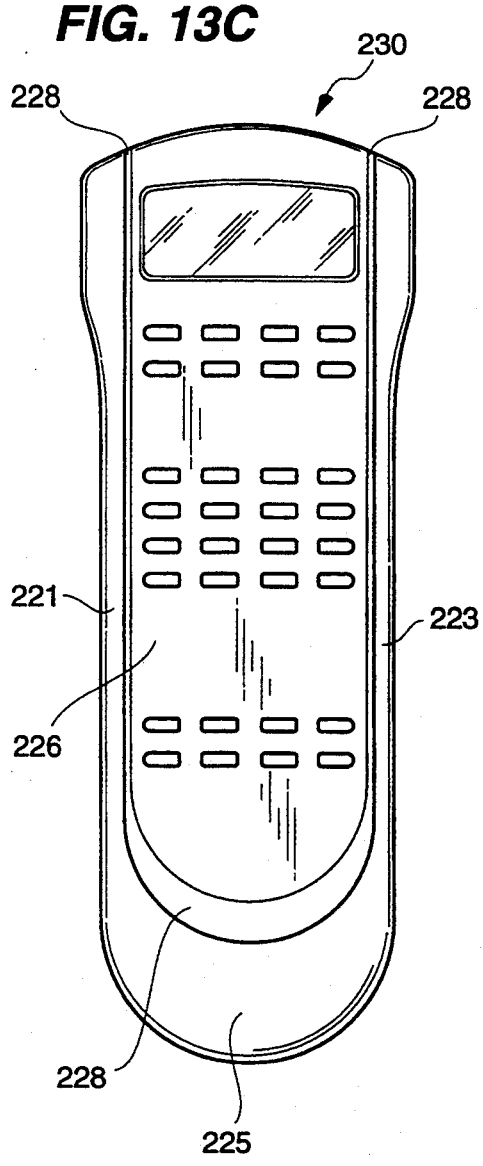

FIGS. 13A, 13B, 13C, and 13D illustrate top plan views of various alternative embodiments similar to the modular remote control casing 172 of FIG. 12. Particularly, in FIG. 13A housing casing 214 includes an interchangeable upper housing member 216 with a keyboard overlay 217 thereon and a cooperative second panel section 218 both slideably received within arms 220 and 222 of U-shaped first panel section 224 to thereby form a unitary cover of three-piece construction. In FIG. 13B a casing 24 has a unitary cover of two-piece construction which includes upper housing member 226 and a keyboard overlay 217 thereon slideably received in arms 221 and 223 of U-shaped panel section 225.

Figure 13D:
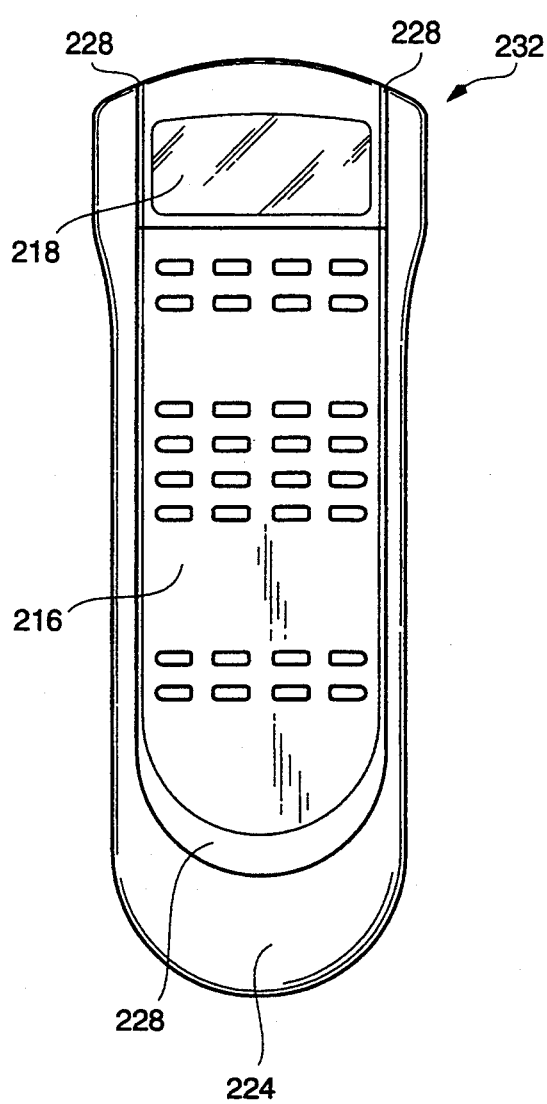

FIGS. 13C and 13D show an upper housing member without a keyboard overlay thereon designed to be slideably received into a spacer body 228 which in turn is slideably connected to U-shaped panel section 224 or U-shaped first panel section 225. In FIG. 13C, casing 230 includes upper housing member 226 slideably received within spacer body 228 that cooperates with both upper housing member 226 and arms 221 and 223 of U-shaped panel section 225 in a manner similar to the grooved track 190 and rail 194 system discussed in reference to FIG. 12. In FIG. 13D, casing 232 includes upper housing member 216 and second panel section 218 both of which are connected to spacer body 228 and therefore interconnected with U-shaped first panel section 224.

Figure 14:
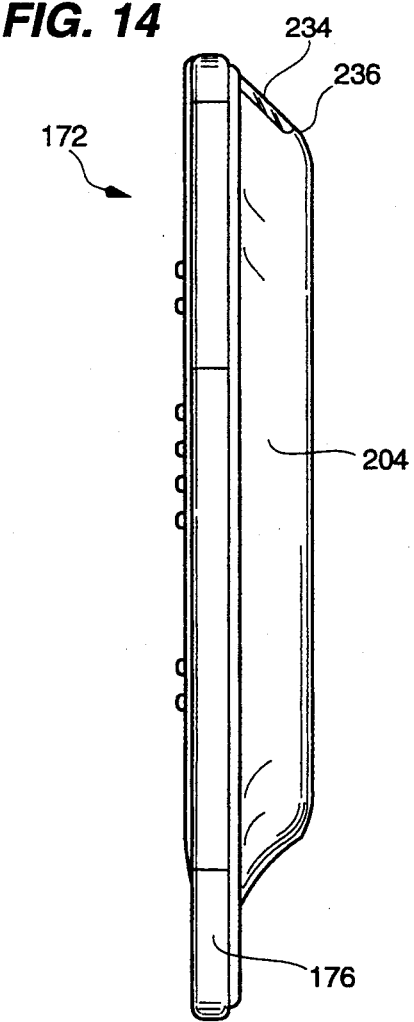
FIG. 14 of the drawings is a side perspective view of the assembled modular casing for remote control of FIG. 12.

FIG. 14 is a side perspective view of the assembled modular remote control casing 172 illustrated at FIG. 12. Lower housing 204 includes lens cap 234 at frontal end 236. FIG. 16 is a side elevational view of FIG. 14 and illustrates in phantom battery compartment 238 and diode 240 operatively connected to electric circuit board 242.

Figure 15:
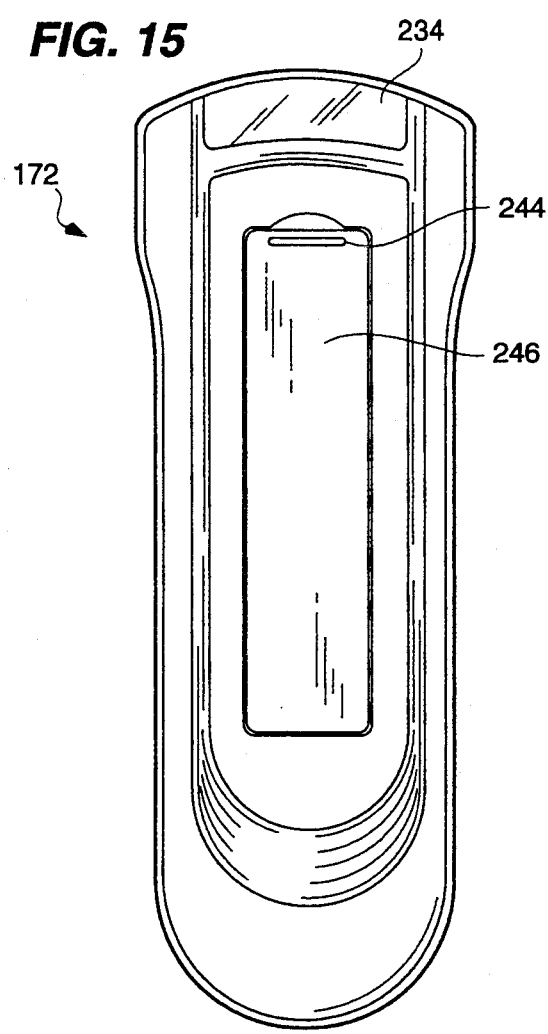
FIG. 15 of the drawings is a bottom plan view of the modular casing for remote control of FIG. 12.

In FIG. 15 there is illustrated a bottom plan view of the modular remote control casing 172 shown at FIGS. 12 and 14 and illustrates latch 244 and door casing 246 to lock the battery compartment 238 closed.

In all of the varying embodiments of the modular remote control casing of the present invention, the interchangeable upper housing member may be provided with rectangular or cross-shaped ports in a number and a design or pattern which correspond to various shaped keys of the interchangeable keyboard which extend outwardly at least partially through the ports. In FIG. 17 the ports are illustrated as being rectangular in shape. The keys which extend at least partially through the rectangular shaped ports 250 may be of varying shapes such as rectangular 252, rectangular with rounded corners 254, oval 256, rectangular offset 258, circular 260, square 262, triangular upward pointing 264, upward semicircular 266, bullet shaped left 268, bullet shaped right 270, triangular downward pointing 272, and downward semi-circular 274. In FIG. 18 the ports are illustrated as being cross-shaped. The keys which extend at least partially through the cross-shaped ports 276 may be of varying shape including circular shaped 278, frustro-conical upward shaped 280, frustro-conical downward shaped 282, rectangular upward set shaped 284, rectangular sideways set shaped 286, cross-shaped 288, bullet shaped downward 290, bullet shaped upward 292, bullet shaped right 294, and bullet shaped left 296.

Alternatively, one can use letter, alphabet-shaped or number-shaped keys as disclosed in U.S. patent application Ser. No. 07/908,252, filed Jul. 2, 1992, the disclosure of which is incorporated herein by reference.

The number and location of upper housing member ports and corresponding keys of a keyboard as well as their design pattern and shape may vary in accordance with numerous potential layout designs of the interchangeable upper housing members and corresponding interchangeable keyboards. Therefore, interchangeable modular parts can cooperate with standardized component parts to form a remote control casing. The various parts of the casing may be made by conventional means in the plastics art, the keyboard overlay may be stamped of mylar, and the internal electrical and diode components may be made by conventional means in the electronic circuitry arts.

Although various embodiments of this invention have been shown and described, it is to be understood that modifications and substitutions, as well as rearrangements and combinations of the proceeding embodiments can be made by those skilled in the art without departing from the teachings of this invention. Accordingly, the scope of the invention is only to be limited as necessitated by the accompanying claims.

I claim:

1. A modular remote control casing comprising: a keyboard, keys on said keyboard for selecting a predetermined function or channel, a circuit board adapted to mate with said keyboard having switches thereon corresponding to said keys, an upper housing member having ports for receiving corresponding keys of said keyboard which extend at least partially through said ports when said keyboard is positioned adjacent said upper housing member, a lower housing member, and means for securing the upper housing member upon said keyboard and to said lower housing comprising a panel section having a pair of arms extending from a base portion thereof, said arms having a grooved track at their inner side periphery, and said upper housing member having at least one rail at its outer side periphery which is slideably receivable into said track of said panel section to thereby form a unitary cover which snapfittingly or by screws interconnects with said lower housing member.

2. A modular remote control casing according to claim 1 further including an overlay panel on said upper housing member.

3. A modular remote control casing comprising: a keyboard, keys on said keyboard for selecting a predetermined function or channel, a circuit board adapted to mate with said keyboard having switches thereon corresponding to said keys, an upper housing member having ports for receiving corresponding keys of said keyboard which extend at least partially through said ports when said keyboard is positioned adjacent said upper housing member, a lower housing member, and means for securing the upper housing member upon said keyboard and to said lower housing comprising a first panel section having a pair of arms extending from a base portion, said arms having a grooved track at their inner side periphery, and said upper housing member and a second panel section each having at least one rail at its outer side periphery which is slideably receivable into said track of said first panel section to thereby form a unitary cover which snap-fittingly or by screws interconnects with said lower housing member.

4. A modular remote control casing according to claim 3 further including an overlay panel on said upper housing member.

* * * * *

UNITED STATES PATENT AND TRADEMARK OFFICE
CERTIFICATE OF CORRECTION

PATENT NO. : 5,422,783
DATED : June 6, 1995
INVENTOR(S) : Paul V. Darbee

It is certified that error appears in the above-indentified patent and that said Letters Patent is hereby corrected as shown below:

Column 7, line 31, "housing 80" should be --housing 88--.

Column 7, lines 63-64, "104 and 104" should be --104 and 106--.

Column 9, line 35, "panel section 224" should be --panel section 225--.

Column 9, line 36, "225." should be --224 respectively--.

Signed and Sealed this

Twenty-first Day of November, 1995

Attest:

BRUCE LEHMAN

Attesting Officer

Commissioner of Patents and Trademarks